United States Patent [19]
Peck

[11] Patent Number: 5,586,176
[45] Date of Patent: Dec. 17, 1996

[54] INTEGRATED WIRELESS COMMUNICATION SYSTEM

[75] Inventor: Jerome Peck, Mission Viejo, Calif.

[73] Assignee: Peck/Pelissier, Costa Mesa, Calif.

[21] Appl. No.: 548,689

[22] Filed: Oct. 26, 1995

Related U.S. Application Data

[63] Continuation of Ser. No. 129,365, Sep. 30, 1993, abandoned.

[51] Int. Cl.6 .............................. H04M 1/60; H04M 9/00; H04M 11/00; H04B 11/00
[52] U.S. Cl. .............................. 379/175; 379/58; 367/132
[58] Field of Search ................................ 379/56, 58, 59, 379/175; 367/132; 455/87, 90, 100; 381/156, 157, 188, 189, 167, 168, 169

[56] References Cited

U.S. PATENT DOCUMENTS

| | | | |
|---|---|---|---|
| 3,267,414 | 8/1966 | Kritz | 367/132 |
| 3,359,535 | 12/1967 | Webb et al. | 367/132 |
| 3,451,039 | 6/1969 | Epstein et al. | 367/132 |
| 4,183,422 | 1/1980 | Williams | 367/132 X |
| 5,136,555 | 8/1992 | Gardos | 367/132 |

*Primary Examiner*—Welington Chin
*Assistant Examiner*—Paul Loomis
*Attorney, Agent, or Firm*—G. Donald Weber, Jr.

[57] ABSTRACT

A wireless communication system, for example for underwater divers, wherein the receiver portion and the transmitter portion of the system are mounted at the user's ear and mouth, respectively, by a single strap. The single strap is also used to maintain the communication system electronics and the mouth mask securely in place.

24 Claims, 2 Drawing Sheets

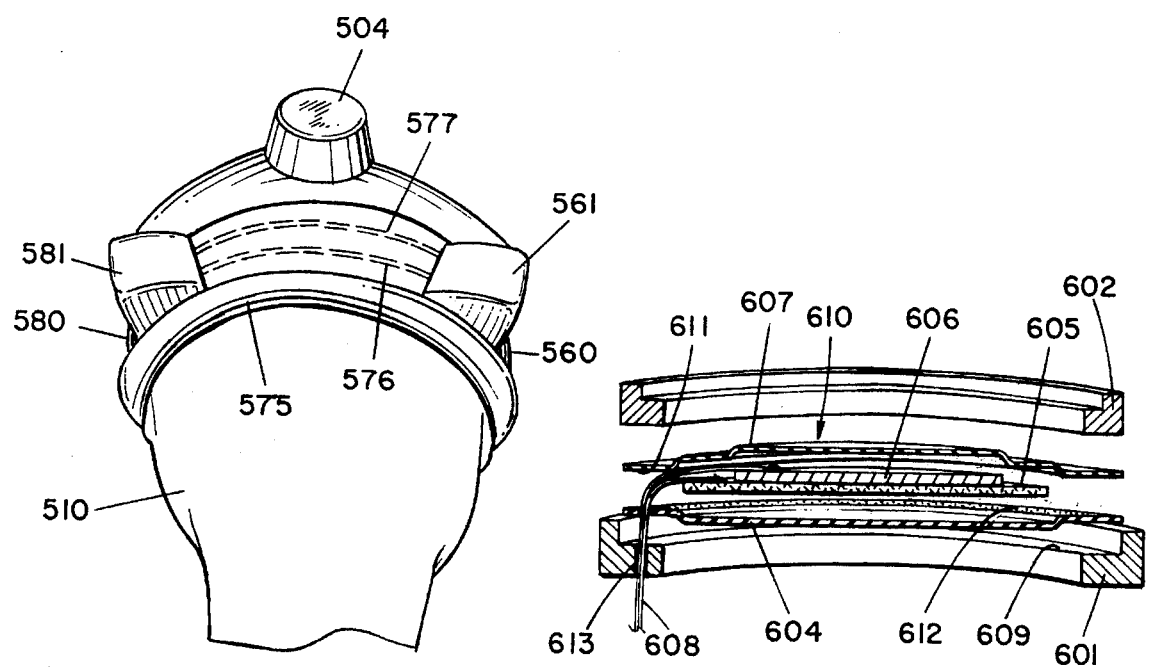
FIG. 5
FIG. 6
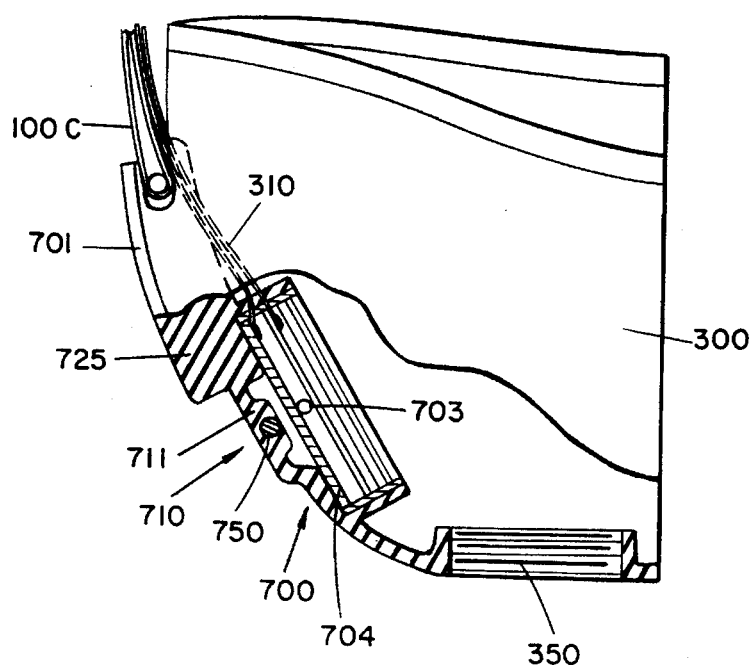
FIG. 7

INTEGRATED WIRELESS COMMUNICATION SYSTEM

This is a continuation of application Ser. No. 08/129,365, Sep. 30, 1993 now abandoned.

BACKGROUND

1. Field of the Invention

This invention is directed, generally, to communications systems used by the underwater divers, and to a fully integrated system for a communication system and the related masks, in particular.

2. Prior Art

There are many communications systems and many masks known in the art. Such masks and systems are used in a variety of hostile or at least, inhospitable, environments. While not limited thereto, one such environment is encountered underwater during diving operations. These "dives" can be for pleasure or for commercials reasons.

Typically, divers are underwater for substantial lengths of time. In many diving activities, it is necessary and/or desirable for one or more divers to be able to communicate with each other intelligently.

Many underwater communication system have been developed. However, these systems tend to be awkward to wear and/or difficult to use. That is, separate masks are required as face masks (primarily eyes and nose) and as mouth masks (primarily for the mouth). These separate masks are, typically, utilized to support the receiver portion of the communications system (adjacent the user's ear) and the transmitter or microphone portion of the system (adjacent the user's mouth). These separate masks are supported by separate support straps or the like. Also, the prior art describes the transceiver (transmitter and receiver) electronics package which is worn on the tank or waist and requires additional cables to connect the microphone (transmitter), earphones (receiver) and push-to-talk switch.

SUMMARY OF THE INSTANT INVENTION

This invention is directed to a wireless communication system, for example for use by underwater divers. In the system, a receiver portion of the system is mounted adjacent to the user's ear while a transmitter portion of the system is mounted adjacent to the user's mouth. An ultrasonic transceiver with transducer is operatively connected to the receiver and to the transmitter portions. A single strap is used to hold the ultrasonic transceiver, transmitter and receiver in place on the diver's head. The same strap is used to maintain the mouth mask, which includes a regulator, in place. The mouth mask includes a switch which is used to selectively enable an internal microphone which is connected to the transmitter. The microphone, the receiver and the transceiver are operated by a single power source. An additional strap can be used for the attachment of the face mask, if desired.

BRIEF DESCRIPTION OF THE DRAWINGS

FIG. 5 is a top rear view of the embodiment shown in FIG. 4.

FIG. 6 is an exploded view of one embodiment of the microphone assembly used with the instant invention.

FIG. 7 is a schematic representation of a push-to-talk (PTT) switch used with the instant invention.

DESCRIPTION OF A PREFERRED EMBODIMENT

Figure 1:
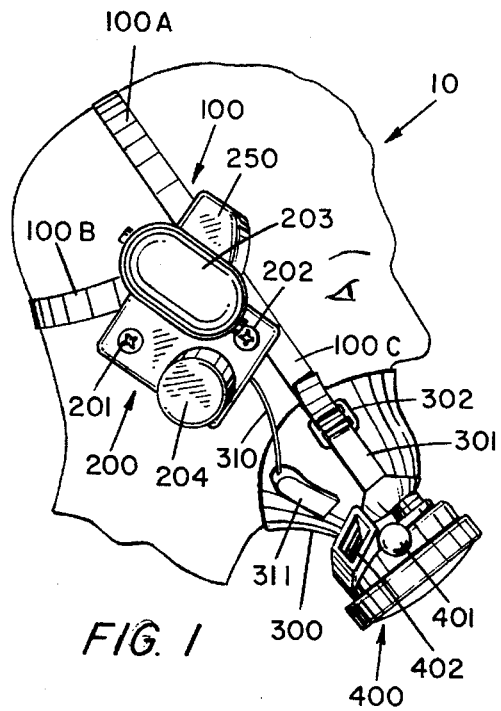
FIG. 1 is one side view of a diver with one embodiment of the instant invention in place.
Figure 2:
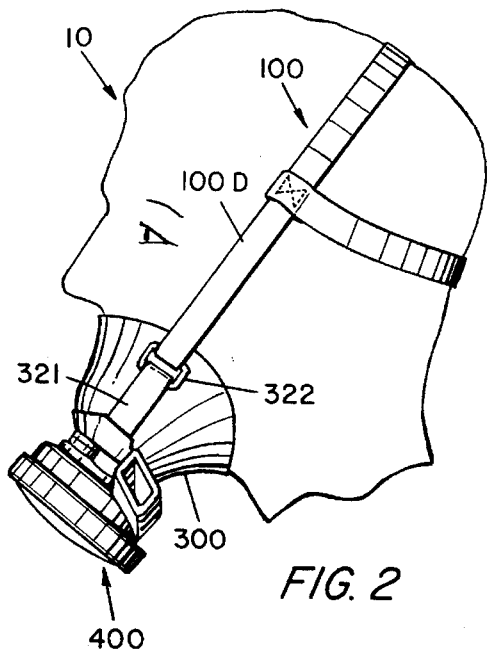
FIG. 2 is the other side view of a diver with the embodiment of the instant invention shown in FIG. 1 in place.

Referring now to FIGS. 1 and 2, concurrently, there are shown opposite side views of one embodiment of the instant invention when worn on a diver's head. In particular, a diver 10 wears the system of the instant invention by placing a head strap 100 at or near the crown of the head. Typically, the strap 100 is formed of a comfortable neoprene material. In this embodiment, the strap 100 is formed as a split strap. That is, a pair of strap segments 100A and 100B are joined together at the ends thereof and to the ends of support strap segments 100C and 100D (as best seen in FIG. 2). This arrangement forms a single strap support worn by the diver. The strap segments 100A and 100B are spread apart at the crown of the user's head to obtain a more secure fit. The opposite ends of the strap segments 100C and 100D are joined to the mask 300. In particular, as shown in FIG. 1, strap segment 100C passes through or is attached to the ultrasonic transceiver/earphone apparatus 200 in such a manner that the apparatus 200 (described infra) is mounted and secured over the right ear of the diver 10. (Of course, the electronic apparatus 200 can be mounted over the left ear, if desired.)

The strap segment 100C is adapted to engage a loop 302 (or other attachment means) which is retained by mask mounting structure 301. Strap segment 100C is passed through loop 302 and returned upon itself. Strap segment 100C can be self-fastening by means of a suitable engagement mechanism such as velcro or other hook and loop devices. Of course, other restraints or fastening devices can be utilized. The mounting structure 301 is, typically, integrally formed with the mouth mask 300. The mask 300 is worn over the mouth of the diver, including the upper lip, cheek and chin.

A second stage regulator 400 (not part of the invention, per se) is attached to the mouth mask 300. The regulator is conventional and includes the exhaust ports 402 and the air inlet port 401. The exhaust ports are vented to the ambient surroundings while the inlet port is connected to an air source, such as an air tank or the like, by a suitable hose or conduit.

A face mask which covers the nose, eyes and a portion of the forehead of the diver is not shown in this embodiment. It is, of course, feasible to install the face mask in conjunction with the strap 100, if so desired.

In the embodiment shown in FIG. 1, the head strap 100 includes the split strap portion which covers the upper rear crown of the head. In another embodiment, the strap 100 can be a single, relatively wide unit fabricated of a comfortable neoprene material. Alternatively, the crown portion of the strap 100 may include an opening of any conventional shape which receives the crown of the head to secure positioning of the strap 100.

The strap 100, in particular strap segment 100C, is adapted to house the receiving apparatus 200 mounted thereon. Typically, the apparatus 200 is positioned over the right ear of the diver. The strap, as will be seen infra, passes through the apparatus 200 to establish connection therewith.

The apparatus 200 includes a first section which may include a speaker, an amplifier and any other components suitable and/or necessary to establish a receiving apparatus which is acceptable in underwater (or other hostile) environments.

The apparatus 200 includes the water switches 201 and 202. These switches function as retainers to keep the apparatus 200 assembled and, as well, as switches which activate the electronics when they are immersed in water. In addition, the apparatus 200 includes a battery storage compartment 203 which is adapted to house a 9 volt battery. The apparatus 200 also includes a transducer 204 which operates as the antenna for receiving signals and for transmitting signals produced by the speaker when activated by the push-to-talk switch 311 via cable 310.

The apparatus is, preferably, mounted to the strap 100C by a support 250 described infra. The support 250 maintains the apparatus 200 in contact with the user's head and in the proper attitude relative to the user's ear.

The strap 100 is connected to the mouth mask 300 by a suitable connection, which can include one or more loops 301 or clips 302 which permit the strap to engage the mouth mask 300 and be cinched up or secured, as necessary.

In the embodiment shown in FIG. 1, the microphone cable 310 is connected between the speaking apparatus, for example, a microphone (see infra), mounted in the mouth mask 300 and the amplifier and power source mounted in the apparatus 200. (The apparatus 200 can be referred to as the electronic module.)

A "push-to-talk" switch 311 is integrally mounted in the mouth mask 300 as part of the speaking apparatus. By using the push-to-talk (PTT) switch 311, the operating cycle of the electronics module 200 is controlled. This reduces drain of the power source batteries.

As best seen in FIG. 7 (infra), the PTT switch 311 is, preferably, located adjacent to a finger (or thumb) stop 725 which permits the user to find the PTT switch 311 easily by tactile feel.

As noted, the second stage regulator 400 is not a part of the invention, per se, but is shown for convenience. Any suitable, well-known second stage regulator can be utilized with the invention. Typically, the regulator 400 is mounted to the mask 300 via a watertight, sealed aperture (or regulator duct) with a mouthpiece which is received by the diver.

Referring now to FIG. 2, there is shown the reverse side of the head of the diver 10 with the split strap 100 mounted thereto. The split strap segments 100A and 100B of the head strap 100 are the same as the head strap described relative to FIG. 1. The temporal head strap portion 100D (similar to strap portion 100C in FIG. 1) passes above the ear of the diver. In this embodiment, strap portion 100D does not support an electronics module 200 or the like. However, for some purposes it may be necessary and/or desirable to utilize binaural sound systems wherein a second (or further) electronics module 200 may be mounted on the left side of head strap 100. For example, the second module could also be used in a receiver only mode for full duplex communications.

Again, the strap segment 100D of strap 100 is connected to the mouth mask 300 by means of a suitable mounting structure 321 and connection loop 322 as are generally known in the art.

Figure 3:
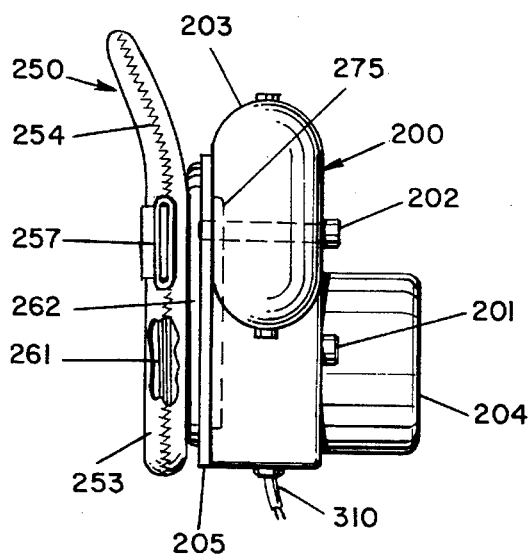
FIG. 3 is an end view of one embodiment of the ultrasonic transceiver portion of the instant invention.

Referring now to FIG. 3, there is shown a partially broken-away end view of the electronics module 200 mounted on the head strap 100 in accordance with the embodiment shown showing in FIGS. 1 and 2.

The electronics module 200 is shown mounted directly to a harness 250 which is adapted to engage strap segment 100C. The harness includes an aperture 251 which passes therethrough and receives strap 100C. In particular, a wire frame 261 can be included in the harness (or support apparatus) 250. The harness 250 is, typically, secured to the electronics module 200 by means of screws or other fastening means (not shown). A friction fit is also contemplated.

The electronics module 200 may include a battery housing 203 (see also FIG. 1). Typically, a 9 volt battery is utilized. An acoustic-rated speaker and related components are also formed in module 200. The speaker 275, shown schematically, is, typically, formed of piezoelectric material potted in urethane. The speaker (or earphone disk) is quite flat to reduce size and to improve the operation thereof. The rear cover 205 is bonded to the main housing of module 200 and covers the speaker 275.

In the preferred embodiment, the ear pad 250 includes a wire frame 261 which is internally mounted in an ear cushion 253. The frame 261 is, typically, formed of stainless steel wire, while the cushion is formed of a soft, comfortable silicone rubber or neoprene material.

As shown in FIG. 3, the ear pad 250 is slightly bent above the aperture 251. In particular, the bend in the cushion 253 is provided as a result of the wire frame 261 having a bend or bias formed therein. The bend in the wire frame 261 is useful in equalizing the strap force across the electronic module 200 and to maintain the electronic module 200 adjacent to the diver's ear.

The cushion 253 can be formed around the frame 261. Alternatively, the cushion can be produced by stitching a plurality of segments together along stitch line 254. The ultrasonic transducer 204 is, generally, a cylindrical component which extends outwardly from the surface of module 200. The transducer 204 converts sound wave energy (mechanical) into electrical energy and vice versa. The transducer 204 is connected to the speaker 275 and to the microphone cable 310. The microphone cable 310 is shown, schematically, depending from the module 200 for connection with the push-to-talk switch 311 (see FIG. 1).

Switches 201 and 202 are shown in this Figure. Switches 201 and 202 are water activated to selectively connect the battery to the electronics module 200. Of course, these switches may be recessed if so desired.

Figure 4:
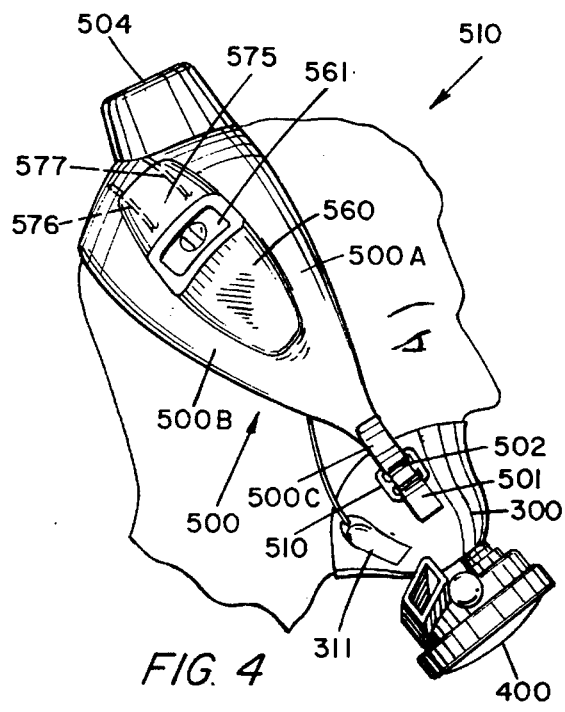
FIG. 4 is one side view of another embodiment of the instant invention.

Referring now to FIGS. 4 and 5, concurrently, there are shown a side view and a top rear view of another embodiment of the instant invention when worn on a diver's head. Again, a diver 510 wears the system of this embodiment by placing a head strap 500 at or near the crown of the head. The strap 500 is formed as a single, relatively wide strap with a pouch 560 or chamber therein. (The edges or sides of the pouch or chamber can be likened to a pair of edge straps similar to the split strap embodiment of FIGS. 1 and 2.) The single strap 500 includes a relatively wide panel 575 at the crown of the user's head.

In the preferred embodiment, the pouch 560 is integrally formed with the edges of the strap 500. The pouch 560 contains the earphone apparatus (similar to apparatus 200 in FIG. 1) so that the earphone apparatus is mounted and secured over one ear of the diver 510. In this case, the earphone apparatus is secured over the left ear (not shown) of the diver.

The strap segment 500C is adapted to engage a loop 502 which is mounted on and integrally joined with the mouth mask 300, as shown in FIG. 1. The mask 300 is, again, worn over the mouth of the diver, including the upper lip, cheek and chin.

A second stage regulator 400 (not part of the invention, per se) is attached to the mouth mask 300. The regulator is conventional and includes the exhaust ports 402 and the air inlet port 401. The exhaust ports are vented to the ambient surroundings while the inlet port is connected to an air source by a suitable hose or conduit.

A face mask which covers the nose, eyes and a portion of the forehead of the diver is not shown in this embodiment. It is, of course, feasible to install the face mask in conjunction with the strap 500, if so desired.

In the embodiment shown in FIGS. 4 and 5, the head strap 500 includes the strap panel 575, which covers the upper rear crown of the head. As noted, the strap 500 can be a single, relatively wide unit fabricated of a comfortable neoprene material. Alternatively, the strap panel 575 may include an opening (not shown) of any convenient shape to receive the crown of the head to secure positioning of the strap 500.

The strap 500 is adapted to mount the receiving apparatus (e.g. module 200) in pouch 560 and the battery in pouch 580 (see FIG. 5). Typically, the apparatus in pouch 560 is positioned over the right ear of the diver and the battery in pouch 580 is positioned over the left ear. The strap 575 is, preferably, integrally formed with the pouches. In addition, other conductors, e.g. conductors 576 and 577, and/or components can be molded directly into the strap 500. The components can include a speaker, an amplifier and any other components suitable and/or necessary to establish a receiving apparatus which is acceptable in underwater (or other hostile) environments (see FIG. 3).

Appropriate plugs or covers 561 and 581 are provided to maintain a watertight seal over the pouches 560 and 580, respectively.

Again, the apparatus can include the water switches 201 and 202 (see FIG. 1) which selectively activate the electronics when they are immersed in water.

Also, the strap 500, for example at panel 575, includes a transducer 504 which operates as the antenna for receiving signals at the earphone and for transmitting signals produced by the speaker when activated by the push-to-talk switch 311 via cable 310.

The transducer 504 is, preferably, mounted to the strap panel 575 by an integrally formed pouch. The support 250 maintains the apparatus 200 in contact with the user's head and in the proper attitude relative to the user's ear.

It is also contemplated that the "dual pouch" system shown in FIGS. 4 and 5 can be arranged so that the pouches (and the respective contents) can be located closer to or even as part of the mouth mask 300. In this case, the battery pouch would be adjacent to one cheek of the user's face. The electronics module would be adjacent to the other cheek of the user's face. In this case, the earphone can be fabricated in a smaller (if necessary) compartment arranged to be mounted over the ear. Alternatively, of course, a "convection" type speaker or earphone can be used. Thus, sound is carried to the user's ear by means of the user's personal bone structure.

Also, the transducer (antenna) can be removed from the crown of the head or over the ear. In this case, the transducer can be mounted under the chin of the user, for example. This arrangement may have a disadvantage due to acoustic interference caused by bubbles escaping from the regulator 400, as a function of the transducer operation.

Referring now to FIG. 6, there is shown an exploded view of the microphone assembly 600 used with the instant invention.

Typically, the microphone assembly 600 is mounted inside the mouth mask 300 (see, for example, FIGS. 1 and 4). In the preferred embodiment, the microphone assembly 600 includes a main microphone housing 601 which can be mounted to or integrally formed with the interior surface of the mouth mask 300. The housing 601 is, typically, a generally cylindrically-shaped housing with an internal shoulder 609 for securing the diaphragm assembly 610 thereto. This housing forms a resonant chamber for the microphone.

In the preferred embodiment, a retaining ring 602 is arranged to fit within the main housing 601. The ring 602 rests on and essentially abuts with the internal shoulder 609 of the main housing 601. The housing 601 and retaining ring 602 are initially assembled in a tight, friction fit. If so desired, the retaining ring 602 can be ultrasonically welded to the housing 601. Alternatively, any suitable adhesive or the like can be utilized. The diaphragm assembly 610 is, thus, maintained in position with the housing 601. Moreover, in this embodiment, both sides of the diaphragm assembly are exposed to the sound field. Thus, the microphone assembly is a gradient or noise cancellation unit.

The diaphragm assembly 610 includes an upper rubber diaphragm 607 and a lower rubber diaphragm 604. These diaphragms are made of a strong, but flexible, rubber material and are used to support the other components in a firm, but flexible, fashion.

A thin brass plate 605 (on the order of 0.010" thick) is adhered to the inner-facing surface of diaphragm 604 by means of a suitable adhesive layer 612. Typically, the adhesive can be provided as a backing on rubber diaphragm 604. However, a separate adhesive can be utilized between the thin brass plate 605 and the diaphragm 604.

A ceramic disk 606, for example, a piezoelectric element, is mounted on the brass plate 605. In addition, the upper surface of the piezoelectric element 606 can be adhered to the innerfacing surface of diaphragm 607 by means of any suitable adhesive, such as an adhesive backing 611 on the diaphragm 607.

Suitable conductors 608, such as electrically conductive wires or the like, are connected to the brass plate 605 and to the ceramic piezoelectric disk 606, respectively. The signal wires 608 are brought out of the diaphragm assembly between the circumferential edges thereof. That is, the wires pass between the circumferential edges of the rubber diaphragms 604 and 607, which are retained between the housing 601 and the retaining ring 602.

This microphone assembly permits rapid, relatively inexpensive production of a gradient microphone. This assembly is waterproof and gradient proof. Moreover, potting thereof is unnecessary. When assembled, the microphone assembly resembles a "hockey puck" configuration.

In the embodiment shown in FIG. 6, the signal wires pass through an axial aperture 613 in the housing 601, whereby they can be connected to control circuits, e.g. electronics module 200. The signal wires 608 are part of the microphone cable 310 shown in FIG. 1.

Referring now to FIG. 7, there is shown a schematic representation of a push-to-talk (PTT) switch 700 which is used in conjunction with the pressure microphone of FIG. 6 with the diving gear described herein.

A portion of mouth mask 300 is shown, partially cutaway. A portion of the mouth mask 300 is defined by a thin, bulbous member 711 on the exterior thereof. Typically, bulb 711 is formed of silicon rubber which is adapted to be relatively flexible. The bulb 711 can be integrally formed in the mask 300.

A fragment of a strap, such as 100C (see FIG. 1), is attached to a typical strap-connecting component 801. The strap-connecting component 702 is, in this instance, formed integrally with the push-to-talk switch 700 (see FIG. 7). By placing the push-to-talk switch 700 at the end of the strap connector, it is relatively easy for the wearer of the mask to tactiley locate the push-to-talk (PTT) switch while the gear is being used.

Thus, the outer cover 711 or bubble of resilient material such as rubber, is adjacent to the end of the strap connector 701. Thus, once the strap connector and, thus, the PTT switch, are located by feel, the operation of the switch is simplified.

Mounted at the bulb 711 is a magnet 750. In a preferred embodiment, the magnet 750 is mounted in the thin wall of bulb 711. Adjacent to the bulb 711 is a magnetic reed switch 703. Typically, reed switch 703 is mounted in a cavity in the mouth mask at or near the mounting for the microphone. Likewise, the microphone is mounted adjacent to the regulator duct or opening 350 in the mouth mask 300.

The reed switch 703 is mounted in a normally "open" condition wherein there is no electrical contact therebetween. With the contacts of reed switch 703 separated to prevent electrical contact therebetween, the microphone assembly 600 is disconnected from the power source included in the electronic module 200.

In order to activate the microphone to permit verbal communication by the diver, the diver presses on the bulb 711 and pushes inwardly, as suggested by the arrow 710. When the bulb 711 is pushed inwardly, the magnet 750 is caused to move inwardly, as well. When the magnet 750 comes into proximity to the reed switch 703, electrical contact is effected inside the reed switch. When the contacts in reed switch 703 are in engagement, a connection is made between the microphone diaphragm (see FIG. 6) and the electronics module 200. In particular, this connection activates an internal transmit/receive switch, typically comprising transistors or the like, included in module 200. The transistor switch removes receiver power and activates transmit power during the speaking mode.

While FIG. 6 shows a pressure field microphone assembly, it should be understood that a so-called "lip microphone" (gradient) can be used, as well. The lip microphone is known in the art and includes an arm or lever which is activated by the user in order to operate the microphone. The mounting and PTT operation will be substantially identical to that shown and described.

Thus, there is shown and described a unique design and concept of masks and communications systems used by underwater divers. The particular configuration shown and described herein relates to a fully integrated system for a communication system and related masks. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A mask apparatus for divers comprising, mask means configured to cover the mouth and surrounding areas of the head of a diver, a power source, microphone means mounted in said mask means, speaker means, strap means connected to said mask means and adapted to be worn on the head of a diver, and support means connected to said strap means to support said power source and said speaker means thereby to provide a unitary mask and communication system for the diver.

said support means is configured to maintain said speaker means adjacent to the diver's ear.

2. The apparatus recited in claim 1 wherein, said microphone means and said speaker means are electrically connected to said power source.

3. The apparatus recited in claim 1 including, switch means connected to said power source and operative to selectively supply power to said microphone means and said speaker means.

4. The apparatus recited in claim 1 including, transducer means for selectively transmitting and receiving acoustical signals, said transducer means connected to said microphone means and said speaker means.

5. The apparatus recited in claim 1 wherein, said mask means includes a second stage regulator.

6. The apparatus recited in claim 1 wherein, said strap means includes a split strap portion.

7. The apparatus recited in claim 1 wherein, said strap means includes housing means for enclosing said power source and said speaker means.

8. The apparatus recited in claim 3 wherein, said switch means comprises water activated switches.

9. The apparatus recited in claim 1 wherein, said power source comprises a battery.

10. The apparatus recited in claim 4 wherein, said transducer means is mounted on said support means.

11. The apparatus recited in claim 1 including, a push-to-talk (PTT) switch mounted in said mask means adjacent to said microphone means and operative to selectively activate said microphone means to permit the diver to communicate via said microphone means.

12. The apparatus recited in claim 5 wherein, said regulator includes an inlet port for selective connection to an air source, at least one outlet port for exhausting air to the ambient, and a mouthpiece which is retained by the diver.

13. The apparatus recited in claims 4 wherein, said transducer means operates as an antenna for said speaker means and for said microphone means.

14. The apparatus recited in claim 1 wherein, said speaker means is formed of piezoelectric material potted in urethane.

15. The apparatus recited in claim 1 wherein, said support means includes a wire frame imbedded in a cushion of soft material.

16. The apparatus recited in claim 4 wherein, said strap means is adapted to be worn at the top of the diver's head, and said transducer means is mounted on said strap so that said transducer means is mounted at the top of the diver's head.

17. The apparatus recited in claim 1 wherein, said microphone means includes a microphone housing mounted at the interior surface of said mask means to form a resonant chamber, a retaining ring tightly assembled to said microphone housing, diaphragm means mounted between said microphone housing and said retaining ring in said resonant chamber, and a piezoelectric element mounted at said diaphragm means.

18. The apparatus recited in claim 17 wherein, said diaphragm means includes first and second diaphragm layers formed of a strong, flexible material.

19. The apparatus recited in claim 18 including, a thin, metallic plate disposed between said first and second diaphragm layers and supporting said piezoelectric element.

20. The apparatus recited in claim 19 including, first and second conductors each having one end connected to said metallic plate and said piezoelectric element, respectively, and the other end connected to said power source.

21. The apparatus recited in claim 19 wherein, said thin, metallic plate is adhered to one of said diaphragm layers and said piezoelectric element is adhered to the other one of said diaphragm layers.

22. The apparatus recited in claim 11 wherein, said PTT switch is mounted in a bulbous housing on the outer surface of said mask means adjacent to said strap means.

23. The apparatus recited in claim 22 including, a magnetic reed switch mounted within said bulbous housing, and a magnet embedded in said bulbous housing adjacent to said magnetic reed switch.

24. A mask apparatus for divers comprising, mask means configured to cover the mouth and surrounding areas of the head of a diver, electronic module means including a power source and speaker means, microphone means mounted in said mask means, strap means adapted to be worn on the head of a diver, and support means adapted to be mounted on said strap means to support said electronic module means to thereby provide a unitary mask and communication system for the diver, said support means configured to bias said electronic module means snugly against the diver's head adjacent to the diver's ear.

* * * * *